US012100905B2

(12) United States Patent
Jeon et al.

(10) Patent No.: US 12,100,905 B2
(45) Date of Patent: Sep. 24, 2024

(54) MULTIPLE COAXIAL CABLE CONNECTOR

(71) Applicant: WITHWAVE, Suwon-si (KR)

(72) Inventors: Jeong Il Jeon, Seoul (KR); Yong Goo Lee, Seoul (KR)

(73) Assignee: WITHWAVE, Suwon-si (KR)

( * ) Notice: Subject to any disclaimer, the term of this patent is extended or adjusted under 35 U.S.C. 154(b) by 285 days.

(21) Appl. No.: 17/633,896

(22) PCT Filed: Aug. 14, 2020

(86) PCT No.: PCT/KR2020/010836
§ 371 (c)(1),
(2) Date: Feb. 8, 2022

(87) PCT Pub. No.: WO2021/034028
PCT Pub. Date: Feb. 25, 2021

(65) Prior Publication Data

US 2022/0294136 A1 Sep. 15, 2022

(30) Foreign Application Priority Data

Aug. 16, 2019 (KR) ........................ 10-2019-0100442

(51) Int. Cl.
*H01R 12/71* (2011.01)
*H01R 13/621* (2006.01)
(Continued)

(52) U.S. Cl.
CPC ....... *H01R 12/714* (2013.01); *H01R 13/6215* (2013.01); *H01R 13/639* (2013.01); *H01R 2103/00* (2013.01)

(58) Field of Classification Search
CPC .......................... H01R 12/714; H01R 13/6215
See application file for complete search history.

(56) References Cited

U.S. PATENT DOCUMENTS 6,764,342 B2 * 7/2004 Murayama ....... H01R 13/65918 439/607.1
7,223,131 B2 * 5/2007 Moll .................... H01R 13/506 439/752
(Continued)

FOREIGN PATENT DOCUMENTS

JP 2011513938 4/2011
KR 200311811 2/2003

OTHER PUBLICATIONS

Search Report from the European Patent Office dated Jun. 29, 2023.
PCT International Search Report mailed on Jan. 12, 2021.

*Primary Examiner* — Neil Abrams

(57) ABSTRACT

Proposed is a multiple coaxial cable connector. The multiple coaxial cable connector includes: multiple coaxial cables, each of the coaxial cables having a cable connector with a pogo pin end making contact with a printed circuit board; a cable guide housing having multiple cable through-holes, each of the cable through-holes allowing a part of each of the coaxial cables including the cable connector to be inserted and guided therein; a cable locker fitted over the coaxial cables and thus coupling the cable guide housing and the coaxial cables to each other; a housing cover covering the lateral surface of the cable guide housing; a reference plate having multiple through-holes, each of the multiple through-holes allowing the cable connector of each of the multiple coaxial cables to be inserted thereinto; and a housing screw coupling the cable guide housing to a coupling hole formed in the printed circuit board.

3 Claims, 9 Drawing Sheets

(51) Int. Cl.

| | |
|---|---|
| ***H01R 13/639*** | (2006.01) |
| *H01R 103/00* | (2006.01) |

(56) References Cited

U.S. PATENT DOCUMENTS

| | | | | |
|---|---|---|---|---|
| 7,658,643 | B2 * | 2/2010 | Tuerschmann | H01R 12/7047 439/573 |
| 8,342,459 | B2 * | 1/2013 | Garrison | H01R 12/63 248/68.1 |
| 8,360,807 | B2 * | 1/2013 | Buff | H01R 24/50 439/752 |
| 8,926,342 | B2 * | 1/2015 | Vinther | H01R 13/6473 439/79 |
| 9,130,328 | B1 * | 9/2015 | Huang | H01R 13/2421 |
| 9,318,824 | B2 * | 4/2016 | Hara | H01R 12/75 |
| 9,368,883 | B2 * | 6/2016 | Chiang | H01R 9/0515 |
| 10,367,280 | B2 * | 7/2019 | Lloyd | H01R 12/75 |
| 10,396,510 | B1 * | 8/2019 | Wagner | H01R 24/50 |
| 10,505,293 | B2 * | 12/2019 | Wagner | H01R 13/512 |
| 10,505,323 | B2 * | 12/2019 | Miller | H01R 24/40 |
| 11,824,316 | B2 * | 11/2023 | Paynter | H01R 13/62938 |
| 2015/0280372 | A1 | 10/2015 | Huang et al. | |
| 2015/0380840 | A1 | 12/2015 | Chiang et al. | |
| 2016/0104956 | A1 | 4/2016 | Santos et al. | |
| 2018/0366844 | A1 | 12/2018 | Beganovic et al. | |
| 2022/0294136 | A1 * | 9/2022 | Jeon | H01R 24/40 |

* cited by examiner

MULTIPLE COAXIAL CABLE CONNECTOR

CROSS-REFERENCE TO RELATED APPLICATION

The present application is a U.S. national phase application of PCT International Application PCT/KR2020/010836, filed Aug. 14, 2020, which claims priority to Korean Patent Application No. 10-2019-0100442, filed Aug. 16, 2019, the entire contents of each of which are herein incorporated by reference.

TECHNICAL FIELD

The present disclosure relates generally to a connector and, more particularly, to a multiple coaxial cable connector capable of preventing signal loss even in a high-frequency range.

BACKGROUND ART

Coaxial cables can transmit electrical signals over a wide frequency range from low frequencies including direct current to high frequencies, and are widely used in various fields including electronics and communications. Such coaxial cables have excellent high-frequency characteristics and have a higher withstand voltage than other cables, so power can be supplied through a coaxial core, which is advantageous for large-capacity data transmission or broadband signal transmission.

In electronic devices or communication devices such as mobile communication repeaters or high-frequency measuring equipment, to connect a board with various built-in parts to another board or to make contact between a board and cables, a connector is provided to make contact between the boards or between the board and the cables. In particular, to adopt the use of a coaxial cable, which has low signal loss, can be used irrespective of the frequency band, and becomes smaller in diameter due to the development of manufacturing technology, a coaxial cable connector consisting of a plug and a receptacle has recently been used. To simultaneously transmit a large amount of data at a high speed, a method of arranging multiple coaxial cables and coupling each connector to the end of an associated one of the coaxial cables is used.

Conventionally, to make contact of multiple coaxial cables with a board, the coaxial cables have to be brought into contact with the board one by one, which is cumbersome and takes a lot of time to assemble a device. In addition, connectors for the respective coaxial cables have to be installed at intervals and thus take up considerable space. This limits miniaturization of the device. To overcome the limit to the miniaturization of the device, narrowing the intervals between the connectors may be considered. However, this approach is still limited because there is a possibility of signal loss due to adjacent coaxial cables.

Therefore, the conventional coaxial cable connectors are problematic in that it is difficult to narrow a contact gap between the coaxial cables, as well as causing signal loss when the gap becomes narrow.

Documents of Related Art: Korean Patent No. 10-1167524 (2012 Jul. 23)

DISCLOSURE

Technical Problem

Accordingly, the present disclosure has been made keeping in mind the above problems occurring in the related art, and an objective of the present disclosure is to provide a multiple coaxial cable connector capable of transmitting signals in various frequency ranges with minimized loss, while increasing the degree of integration of coaxial cables.

Technical Solution

In order to accomplish the above objective, the present disclosure provides a multiple coaxial cable connector including: multiple coaxial cables, each of the coaxial cables having a cable connector with a pogo pin end making contact with a printed circuit board; a cable guide housing having cylinder-shaped multiple cable through-holes, each of the cable through-holes allowing a part of each of the coaxial cables including the cable connector to be inserted and guided therein; a cable locker fitted over the coaxial cables in a direction perpendicular to an insertion direction of the coaxial cables, which are inserted into the cable through-holes of the cable guide housing, from a lateral surface of the cable guide housing and thus coupling the cable guide housing and the coaxial cables to each other such that the coaxial cables do not move opposite from the insertion direction; a housing cover covering the lateral surface of the cable guide housing which is coupled to the multiple coaxial cables by the cable locker to prevent the cable locker from being detached; a reference plate having multiple through-holes, each of the multiple through-holes allowing the cable connector of each of the multiple coaxial cables to be inserted thereinto, and coupled to the cable guide housing such that the housing cover does not move in the insertion direction by a latching protrusion formed on the housing cover; and a housing screw coupling the cable guide housing to a coupling hole formed in the printed circuit board.

The multiple coaxial cable connector may further include an SMD socket having a socket shape with a predetermined height and mounted on a surface of the printed circuit board, the SMD socket having a connector coupling portion formed at each of opposite ends thereof and coupled to the housing screw, multiple contact holes formed in a bottom surface thereof, each of the contact holes allowing an end of each of the multiple coaxial cables to be received therein and make electrical contact with a pattern of the printed circuit board, and the bottom surface excluding the contact holes, the bottom surface making surface contact with the reference plate. An end portion of each of the multiple coaxial cables may further have a cylindrical member with a cut lateral surface, the cylindrical member being configured to be elastically deformed in a retracting direction by an external force when received in an associated one of the contact holes of the SMD socket in order to increase a coupling force between an external conductor of the coaxial cable and the bottom surface of the SMD socket.

Advantageous Effects

According to a multiple coaxial cable connector according to the present disclosure, by the use of pogo pins, it is possible to increase a contact force between cables and a printed circuit board. In addition, by an organic coupling relationship between a cable locker and a reference plate, it is possible to increase the degree of integration of multiple coaxial cables and minimize signal loss attributable to the high degree of integration.

In addition, the multiple coaxial cable connector according to the present disclosure is applicable to various frequency ranges including ultra-high frequencies.

MODE FOR INVENTION

Hereinafter, an exemplary embodiment of the present disclosure will be described in detail with reference to the accompanying drawings. Specific structural and functional descriptions of the embodiment of the present disclosure disclosed herein are only for illustrative purposes, and the present description is not intended to represent all of the technical spirit of the present disclosure. The present disclosure is intended to cover not only the exemplary embodiment, but also various alternatives, modifications, equivalents, and other embodiments that may be included within the spirit and scope of the present disclosure as defined by the appended claims.

Figure 1:
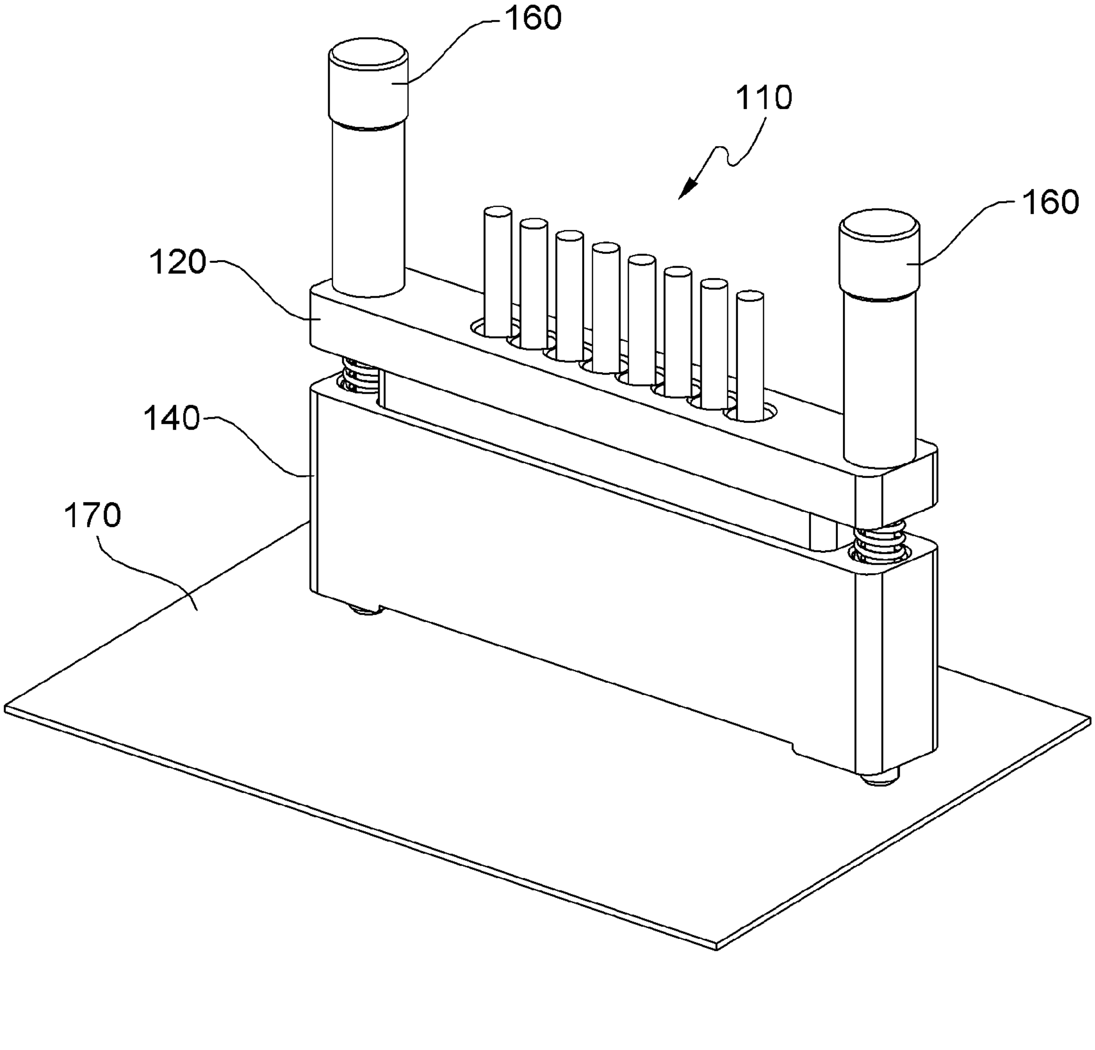
FIG. 1 is a perspective view illustrating an example of the configuration of a multiple coaxial cable connector according to an embodiment of the present disclosure.
Figure 2:
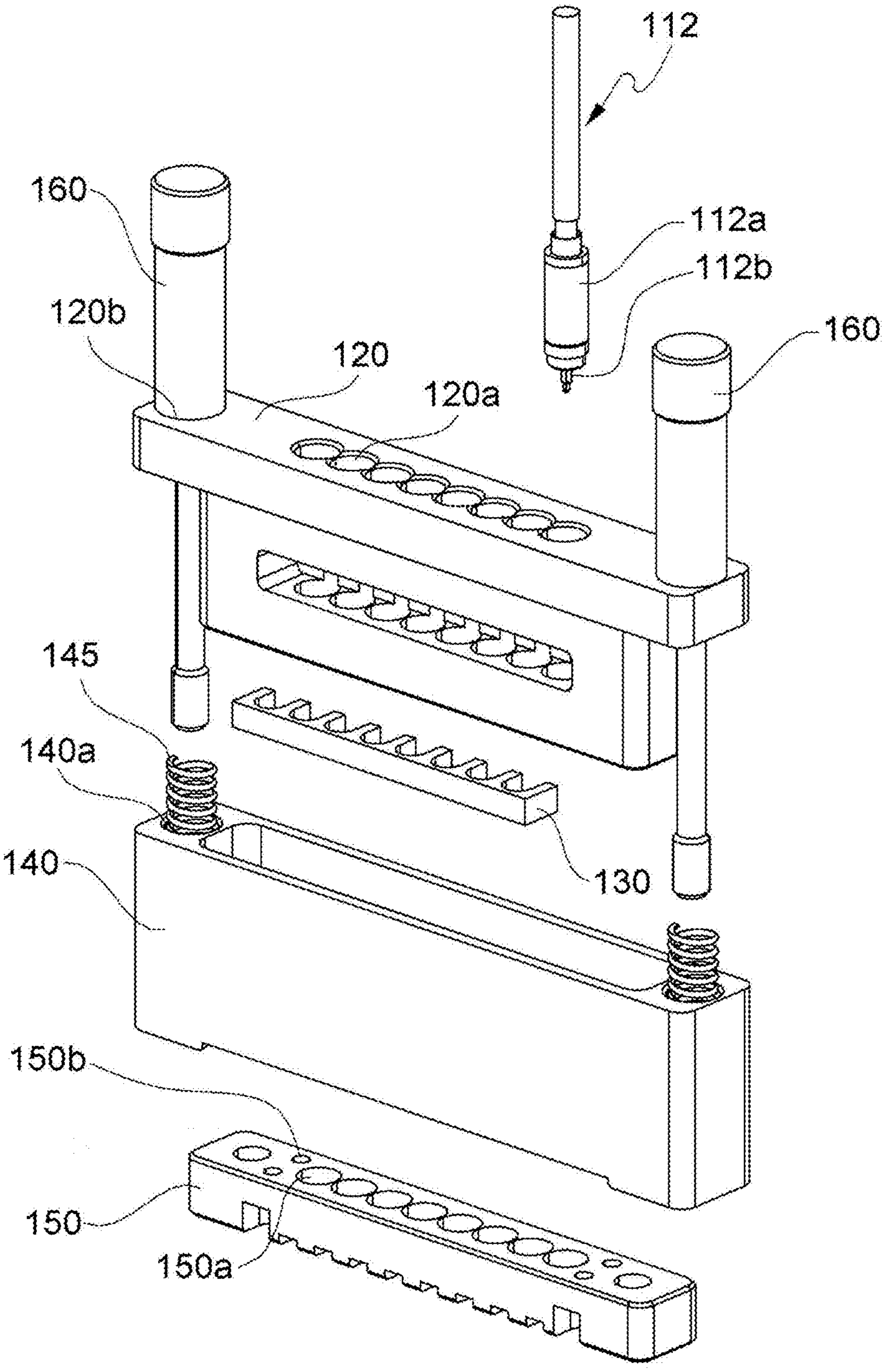
FIG. 2 is a view illustrating the components of the multiple coaxial cable connector according to the embodiment of the present disclosure.

FIG. 1 is a perspective view illustrating the configuration of a multiple coaxial cable connector according to an embodiment of the present disclosure. FIG. 2 is a view illustrating the components of the multiple coaxial cable connector according to the embodiment of the present disclosure. Referring to FIGS. 1 and 2, the multiple coaxial cable connector according to the embodiment of the present disclosure includes multiple coaxial cables 110, a cable guide housing 120, a cable locker 130, a housing cover 140, and a reference plate 150, and housing screws 160.

The multiple coaxial cables 110 are composed of multiple coaxial cables 112 arranged at intervals. Each of the coaxial cables 112 has a cable connector 112*a* with a pogo pin end 112*b* contacting and connected to a printed circuit board (PCB, 170).

The cable guide housing 120 has cylinder-shaped multiple cable through-holes 120*a* and a screw through-hole 120*b* formed at each of opposite ends thereof. A part of each of the coaxial cables 112 including the cable connector 112*a* is inserted and guided in an associated one of the multiple cable through-holes 120*a*. The cable guide housing 120 may be made of metal or plastic. Each of the respective screw through-holes 120*b* has a thread and is screw-coupled to an associated one of the housing screws 160 via the thread.

The cable locker 130 is fitted over the coaxial cables 110 in a direction perpendicular to an insertion direction of the coaxial cables 110, which are inserted into the cable through-holes 120*a* of the cable guide housing, from a lateral surface of the cable guide housing 120 and thus couples the cable guide housing 120 and the coaxial cables 110 to each other such that the coaxial cables 110 do not move opposite from the insertion direction.

The housing cover 140 covers the lateral surface of the cable guide housing 120 which is coupled to the multiple coaxial cables 110 by the cable locker 130 to prevent the cable locker 130 from being detached. The housing cover 140 has cover coupling holes 140*a* formed therein. A spring 145 serving as an elastic member that provides an elastic force when the cable guide housing 120 and the housing cover 140 are coupled to each other is inserted into each of the cover coupling holes 140*a*. The housing screws 160 are inserted into the respective springs 145.

The reference plate 150 has multiple through-holes 150*a*, each of the multiple through-holes allowing the cable connector 112*a* of each of the multiple coaxial cables 110 to be inserted thereinto, and is coupled to the cable guide housing 120 such that the housing cover 140 does not move in the insertion direction by a latching protrusion (not illustrated) formed on the housing cover 140. The coupling between the reference plate 150 and the cable guide housing 120 is achieved through screw holes 150*b* formed in the reference plate 150. The reference plate 150 has a bottom surface contacting a ground plane of the printed circuit board 170 and serving as a ground, and is also connected to each external conductor of each of the coaxial cables 110 to increase a grounding force and reduce signal loss.

The housing screws 160 are inserted into the screw through-holes 120*b* formed in the cable guide housing 120 and couple the cable guide housing 120 to coupling holes formed in the printed circuit board 170.

Figure 3:
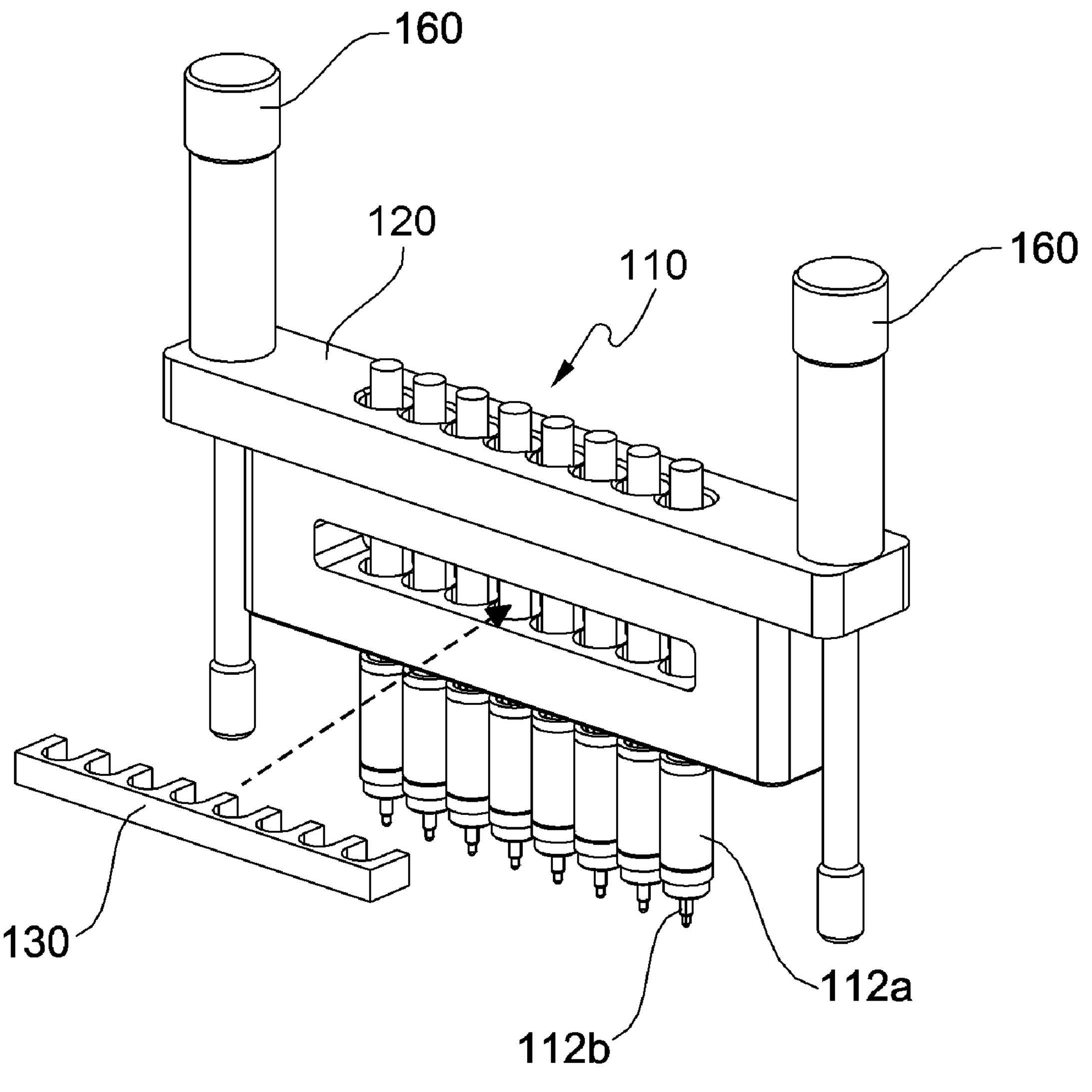
FIG. 3 is a perspective view illustrating an assembling process of the multiple coaxial cable connector according to the embodiment of the present disclosure.

FIG. 3 is a perspective view illustrating an assembling process of the multiple coaxial cable connector according to the embodiment of the present disclosure, in which the cable locker 130 is fitted in a state where the housing screws 160 and the multiple coaxial cables 110 are mounted in the cable guide housing 120. Referring to FIG. 3, in a state where the housing screws 160 are inserted into and screw-coupled to the screw through-holes 120*b* of the cable guide housing 120, and the multiple coaxial cables 110 are inserted into the cable through-holes 120*a* of the cable guide housing 120, the cable locker 130 is fitted over the coaxial cables 110 in a direction perpendicular to the insertion direction of the coaxial cables 110 from the lateral surface of the cable guide housing 120. As a result, the cable guide housing 120 and the coaxial cables 110 are coupled to each other such that the coaxial cables 110 do not move opposite to the insertion direction.

Figure 4:
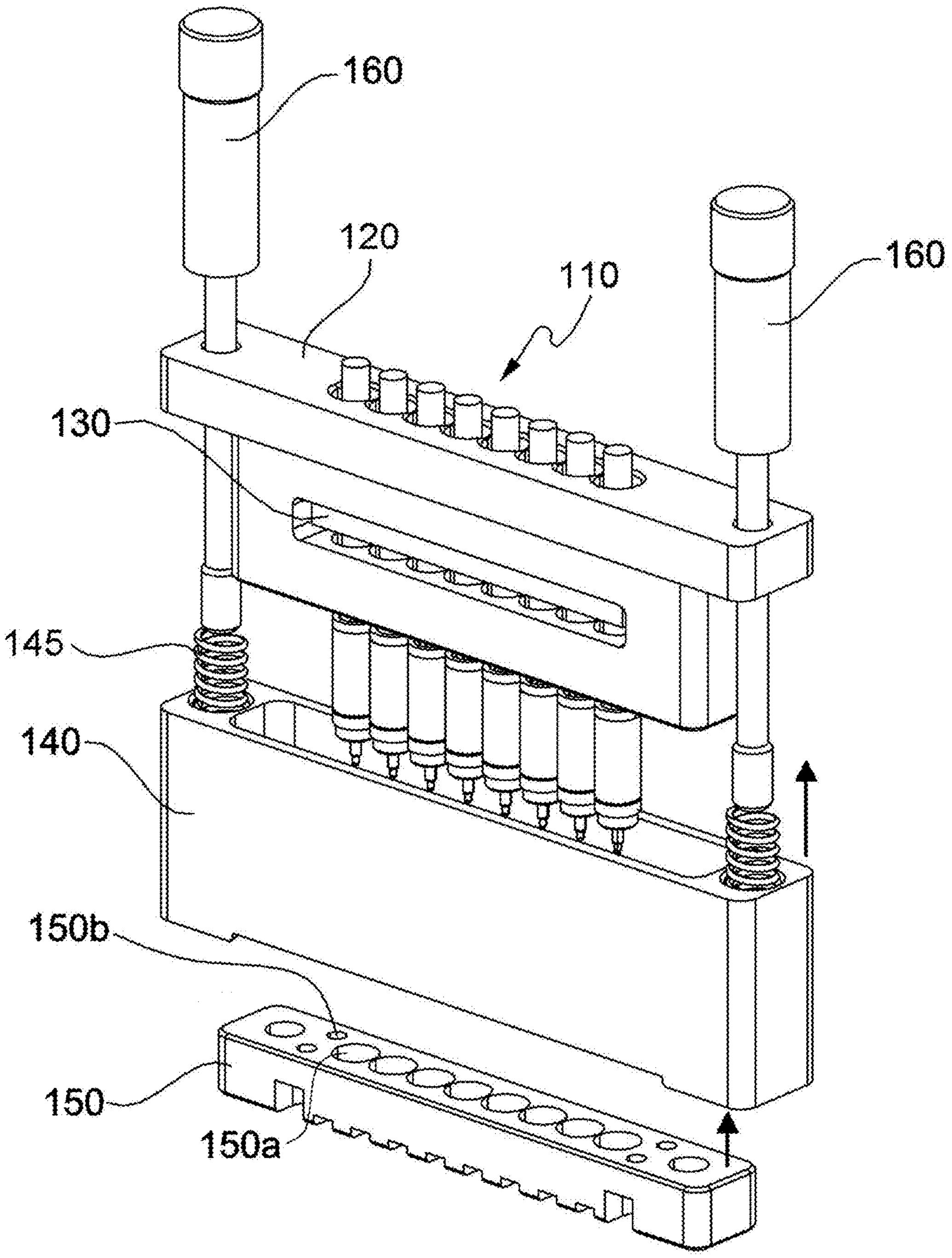
FIG. 4 is a perspective view illustrating a process in which a housing cover is mounted after fitting of a cable locker illustrated in FIG. 3 and a process in which a reference plate is coupled.

FIG. 4 is a perspective view illustrating a process in which the housing cover 140 is mounted after fitting of the cable locker 130 illustrated in FIG. 3 and a process in which the reference plate 150 is coupled. Referring to FIG. 4, after fitting of the cable locker 130, the housing cover 140 covers the lateral surface of the cable guide housing 120 which is coupled to the coaxial cables 110 by the cable locker 130 to prevent the cable locker 130 from being detached. The springs 145 that provide an elastic force when the cable guide housing 120 and the housing cover 140 are coupled to each other are inserted into the cover coupling holes 140*a* formed in the housing cover 140.

When the cable guide housing 120 coupled to the coaxial cables 110 by the cable locker 130 is mounted to the housing cover 140, the respective cable connectors 112*a* of the multiple coaxial cables 110 are inserted into the multiple through-holes 150*a* formed in the reference plate 150, and the cable guide housing 120 and the reference plate 150 are coupled to each other such that the housing cover 140 does not move in the insertion direction by the latching protrusion (not illustrated) formed on the housing cover 140. The coupling between the reference plate 150 and the cable guide housing 120 is achieved through the screw holes 150*b* formed in the reference plate 150.

Figure 5:
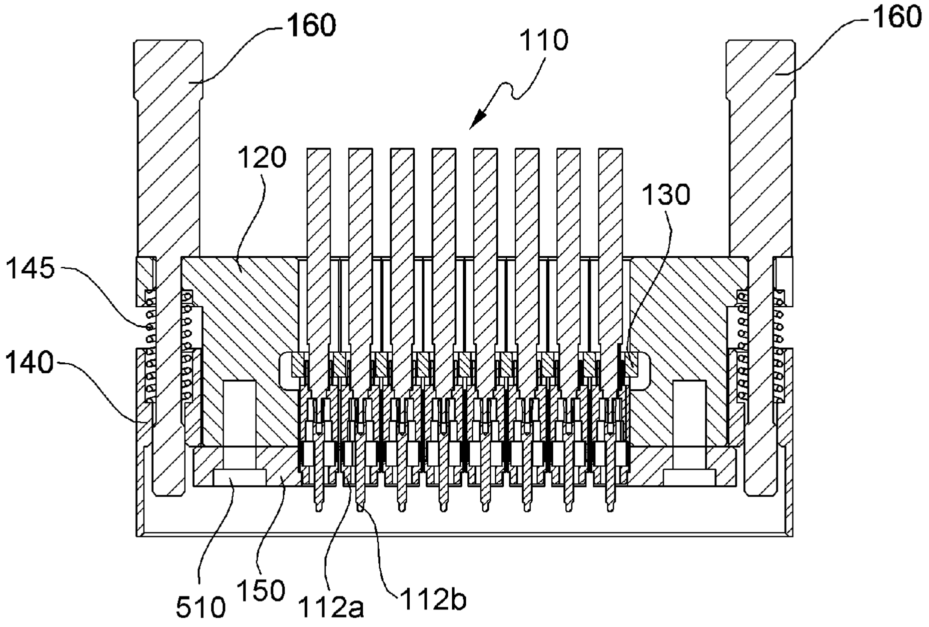
FIG. 5 is a sectional view illustrating the multiple coaxial cable connector according to the embodiment of the present disclosure in which the housing cover is mounted after fitting of the cable locker illustrated in FIG. 3 and the reference plate is coupled.

FIG. 5 is a sectional view illustrating the multiple coaxial cable connector according to the embodiment of the present disclosure in which the housing cover 140 is mounted after fitting of the cable locker 130 illustrated in FIG. 3 and the reference plate 150 is coupled. Referring to FIG. 5, the reference plate 150 and the cable guide housing 120 are coupled to each other by coupling members 510 inserted through the screw holes 150*b* formed in the reference plate 150.

Figure 6A:
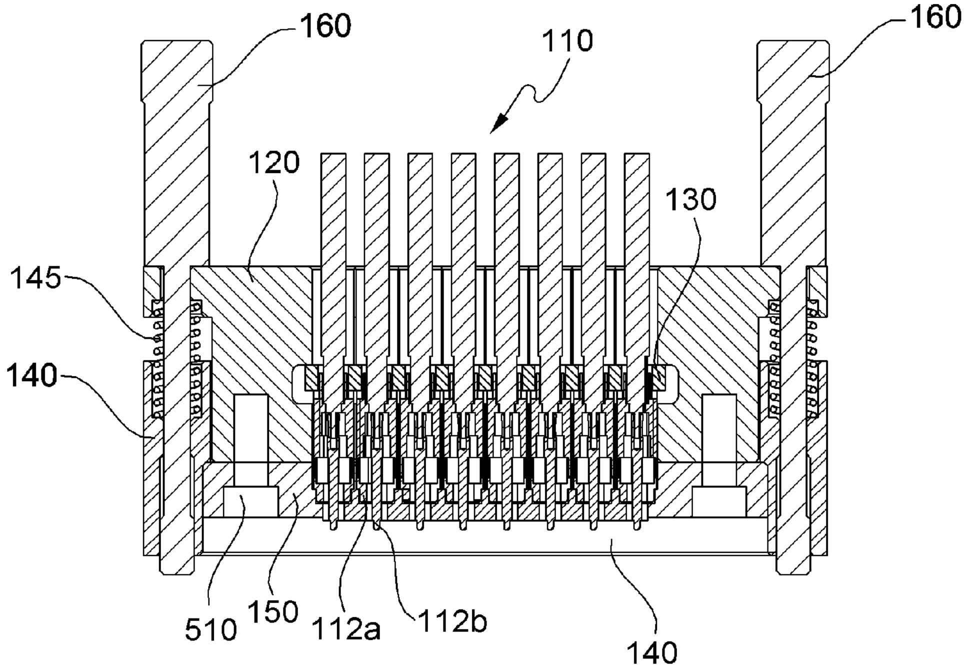
FIG. 6*a* is a sectional view illustrating the multiple coaxial cable connector according to the embodiment of the present disclosure before being coupled to a printed circuit board by housing screws.
Figure 6B:
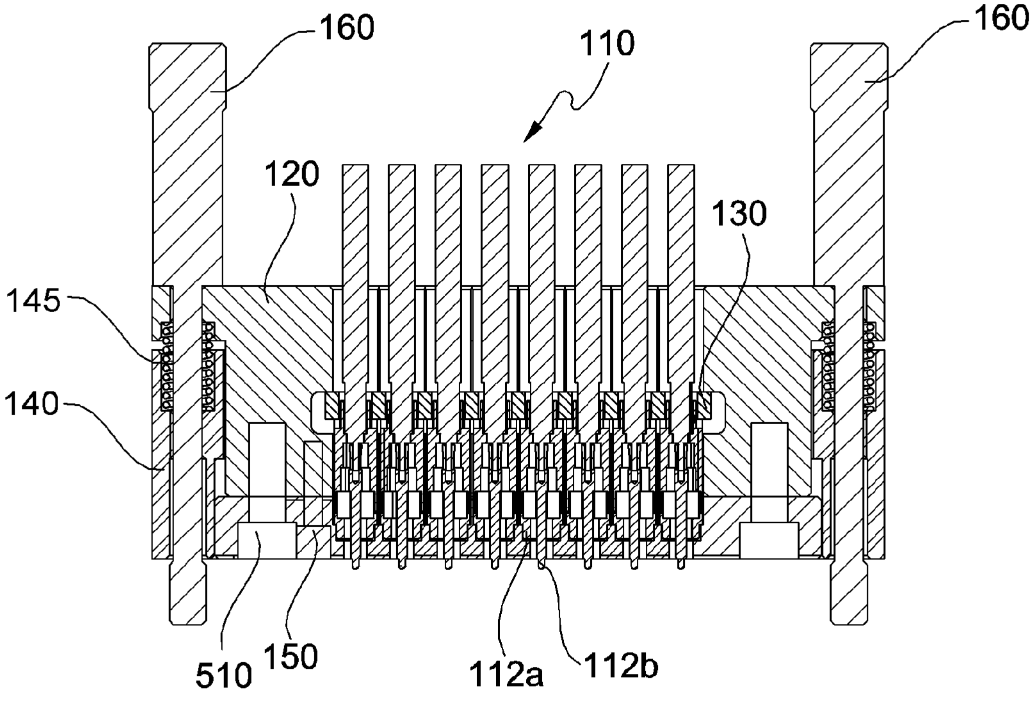
FIG. 6*b* is a sectional view illustrating the multiple coaxial cable connector according to the embodiment of the present disclosure after being coupled to coupling members of the printed circuit board by the housing screws.

FIG. 6*a* is a sectional view illustrating the multiple coaxial cable connector according to the embodiment of the present disclosure before being coupled to the printed circuit board 170 by the housing screws 160. FIG. 6*b* is a sectional view illustrating the multiple coaxial cable connector according to the embodiment of the present disclosure after being coupled to coupling members of the printed circuit board 170 by the housing screws 160.

Referring to FIG. 6*a*, the multiple coaxial cable connector according to the embodiment of the present disclosure is in a state before being coupled to the printed circuit board 170. The housing screws 160 are not coupled to connector coupling members (not illustrated) of the printed circuit board 170, so the springs 145 are in a non-compressed state, and the respective pogo pin ends 112*b* of the coaxial cables are positioned in the housing cover 140 without being exposed outside the bottom surface of the reference plate 150. Referring to FIG. 6*b*, the multiple coaxial cable connector according to the embodiment of the present disclosure is in a state after being coupled to the connector coupling members (not illustrated) of the printed circuit board 170, so the springs 145 are in a compressed state, and the pogo pin ends 112*b* of the coaxial cables are exposed outside the bottom surface of the reference plate 150.

Figure 7:
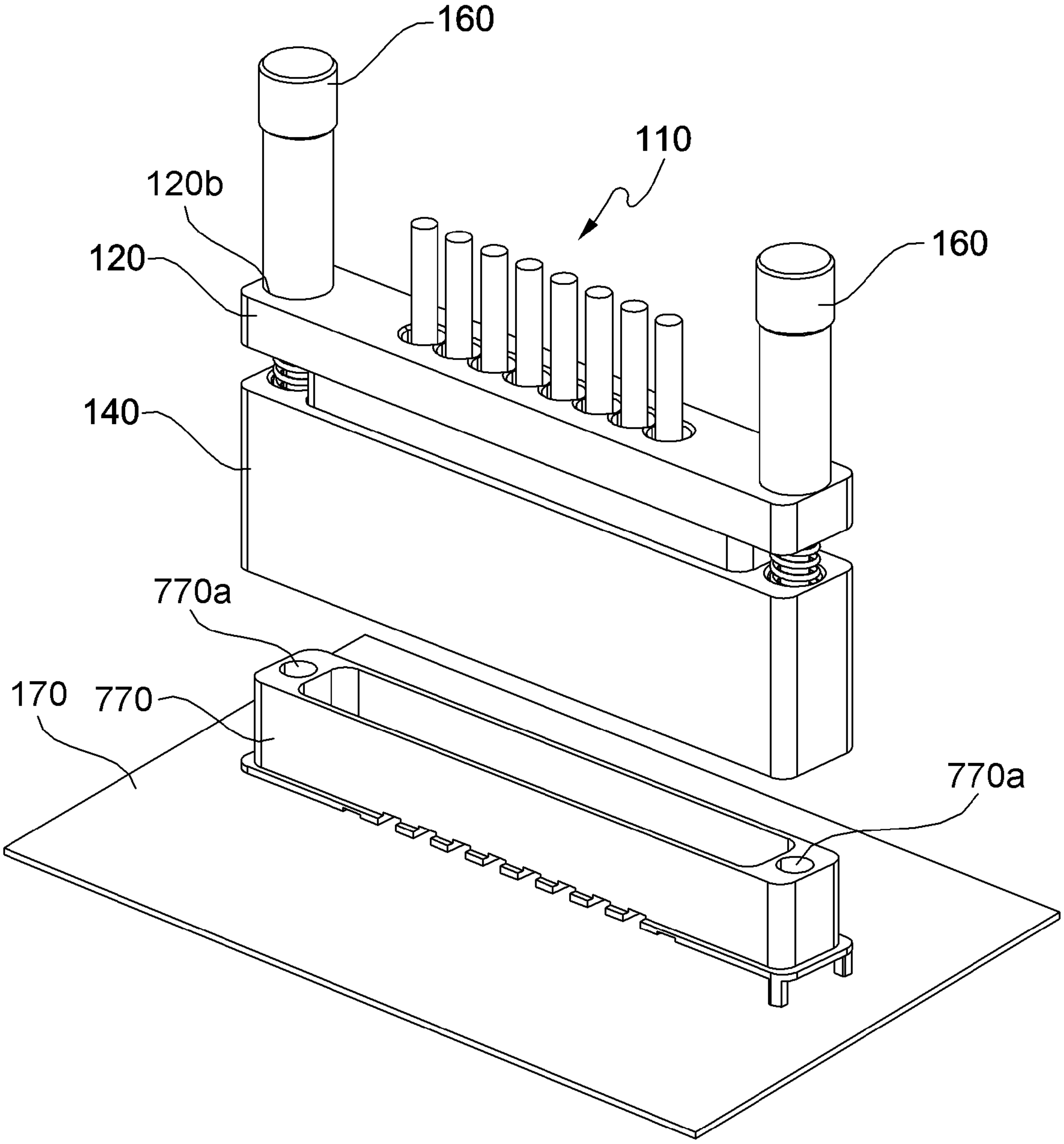
FIG. 7 is a perspective view illustrating an example of a multiple coaxial cable connector having a socket according to the present disclosure.

FIG. 7 is a perspective view illustrating an example of a multiple coaxial cable connector having a socket according to the present disclosure. Referring to FIG. 7, the multiple coaxial cable connector having the socket according to the present disclosure differs from the multiple coaxial cable connector according to the present disclosure illustrated in FIGS. 1 and 2 in that an SMD socket 770 is further provided in addition to multiple coaxial cables 110, a cable guide housing 120, a cable locker 130, a housing cover 140, a reference plate 150, and housing screws 160. The multiple coaxial cables 110, the cable guide housing 120, the cable locker 130, the housing cover 140, the reference plate 150, and the housing screws 160 have been described with reference to FIGS. 1 and 2, so the descriptions thereof are omitted.

The SMD socket 770 has a socket shape with a predetermined height and is mounted on a surface of a printed circuit board 170. The SMD socket 770 has a connector coupling portion 770*a* formed at each of opposite ends thereof and coupled to an associated one of the housing screws 160, multiple contact holes (not illustrated) formed in a bottom surface thereof, each of the contact holes allowing an end of each of the multiple coaxial cables 110 to be received therein and make electrical contact with a pattern of the printed circuit board 170, and the bottom surface excluding the contact holes (not illustrated), the bottom surface making surface contact with the reference plate 150.

In addition, a cylindrical member receiving recess (not illustrated) may be formed in the bottom surface of the SMD socket 770. The cylindrical member receiving recess (not illustrated) allows a cylindrical member 914 of a coaxial cable 912 of another example illustrated in FIG. 9 to be received therein when the multiple coaxial cable connector is coupled to the SMD socket 770, and conforms to the shape of the cylindrical member 914.

Figure 8A:
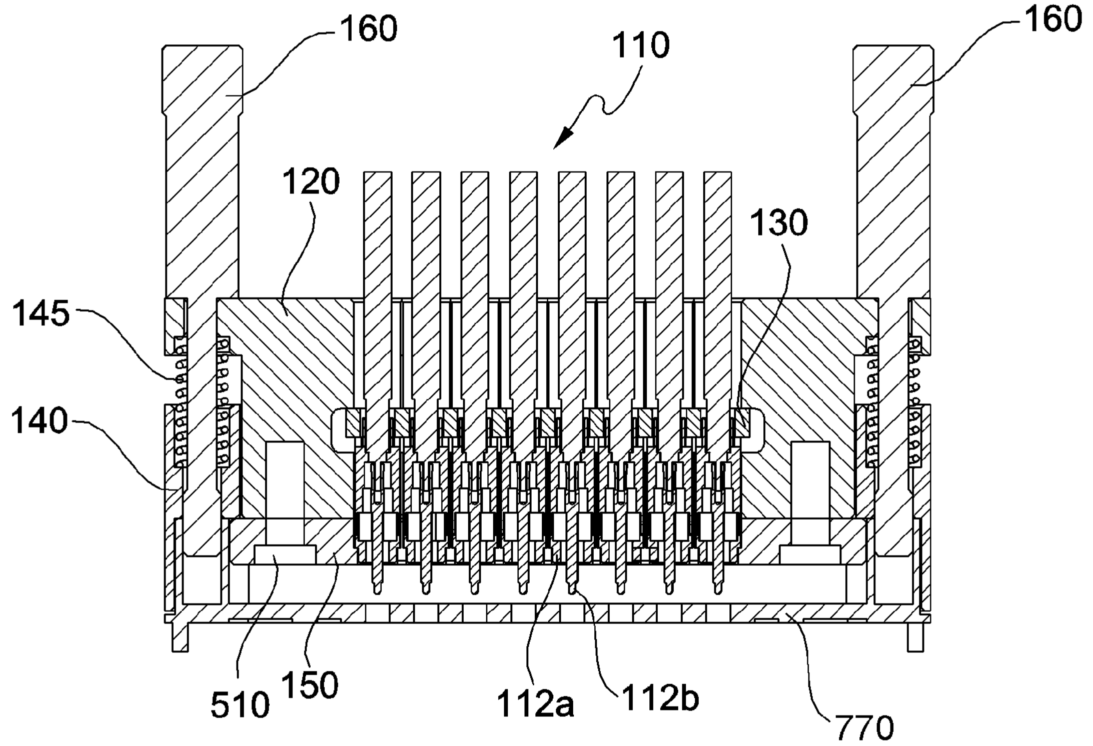
FIG. 8*a* is a sectional view illustrating the multiple coaxial cable connector having the socket according to the present disclosure before being coupled to an SMD socket by housing screws.
Figure 8B:
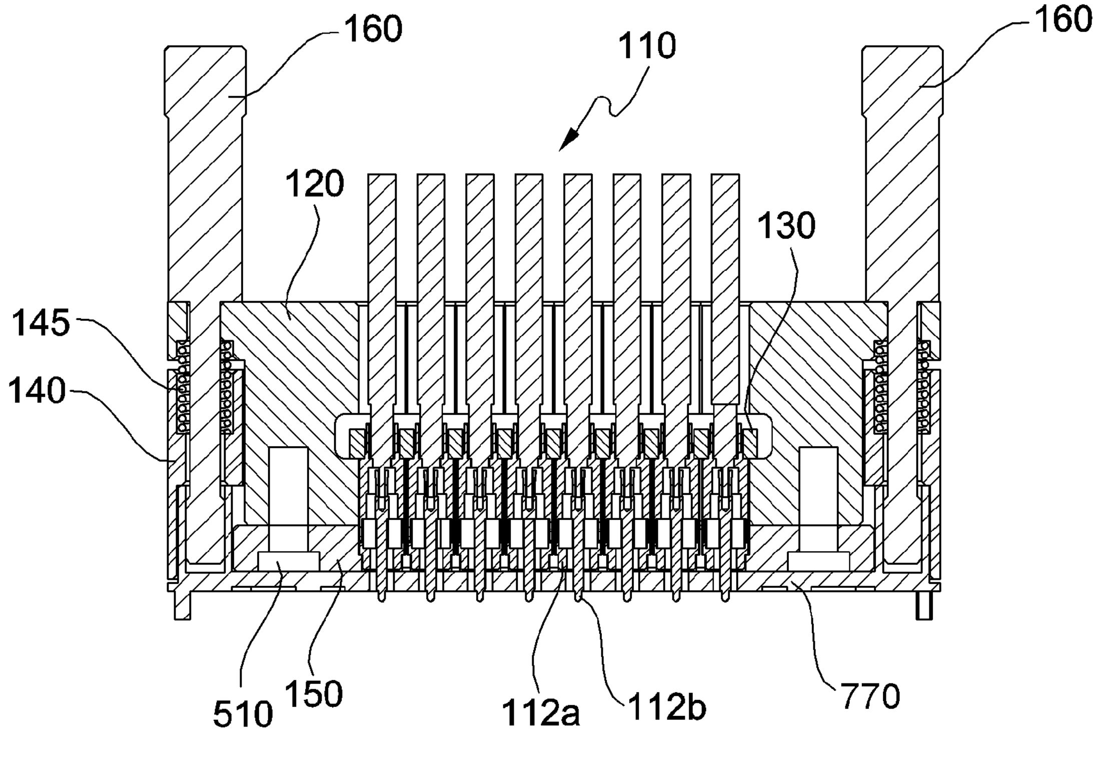
FIG. 8*b* is a sectional view illustrating the multiple coaxial cable connector having the socket according to the present disclosure after being coupled to the SMD socket by the housing screws.

FIG. 8*a* is a sectional view illustrating the multiple coaxial cable connector having the socket according to the present disclosure before being coupled to the SMD socket 770 by the housing screws 160. FIG. 8*b* is a sectional view illustrating the multiple coaxial cable connector having the socket according to the present disclosure after being coupled to the SMD socket 770 by the housing screws 160.

Referring to FIG. 8*a*, the multiple coaxial cable connector having the socket according to the embodiment of the present disclosure is in a state of being inserted into but not coupled to the SMD socket 770. The housing screws 160 are not coupled to the SMD socket 770, so springs 145 are in a non-compressed state, and pogo pin ends 112*b* of the coaxial cables are positioned in the SMD socket 770 without being exposed outside through the contact holes formed in the bottom surface of the SMD socket 770.

Referring to FIG. 8*b*, the multiple coaxial cable connector having the socket according to the embodiment of the present disclosure is in a state after being inserted and coupled to the SMD socket 770. The housing screws 160 are not coupled to the SMD socket 770, so springs 145 are in a non-compressed state, and pogo pin ends 112*b* of the coaxial cables are positioned in the SMD socket 770 without being exposed outside through the contact holes formed in the bottom surface of the SMD socket 770.

Figure 9:
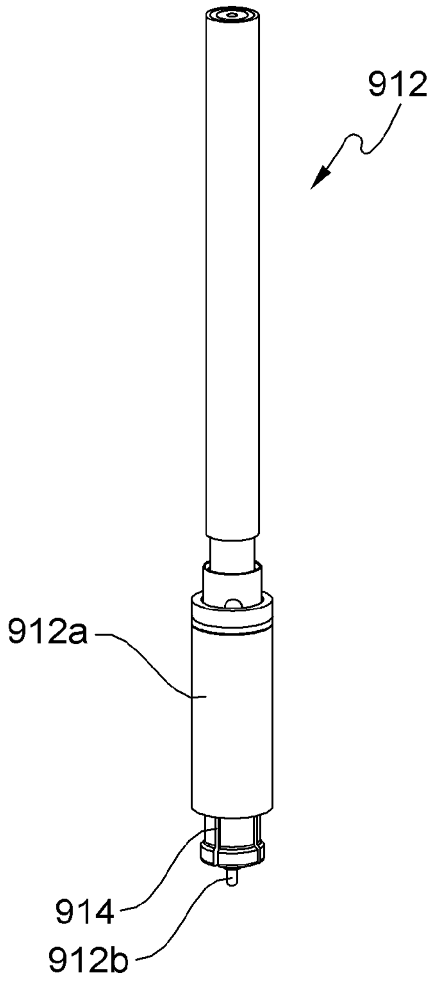
FIG. 9 is a view illustrating another example of a coaxial cable used in the multiple coaxial cable connector according to the present disclosure.

FIG. 9 is a view illustrating another example of a coaxial cable used in the multiple coaxial cable connector according to the present disclosure. The coaxial cable of the other example is another type of the coaxial cable 112 illustrated in FIG. 2. As illustrated in FIG. 9, the coaxial cable 912 having the cylindrical member 914 with a cut lateral surface may be used. The coaxial cable 912 has a cable connector 912*a* having a pogo pin end 912*b* contacting and connected to a printed circuit board (PCB, 170), and the cylindrical member 914 with the cut lateral surface. The cylindrical member 914 is elastically deformed in a retracting direction by an external force when received in an associated one of the contact holes (not illustrated) of the SMD socket 770 in order to increase a coupling force between an external conductor of the coaxial cable 912 and the bottom surface of the SMD socket 770.

Although the embodiment of the present disclosure has been described with reference to the accompanying drawings for illustrative purposes, those skilled in the art will appreciate that various modifications, additions, and substitutions are possible, without departing from the scope and spirit of the disclosure. It is thus well known to those skilled in that art that the patent right of the present disclosure should be defined by the scope and spirit of the disclosure as defined in the appended claims.

INDUSTRIAL APPLICABILITY

The present disclosure can find application in electronic devices or communication devices such as mobile communication repeaters or high-frequency measuring equipment.

The invention claimed is:

1. A multiple coaxial cable connector comprising:

multiple coaxial cables, each of the coaxial cables having a cable connector with a pogo pin end contacting a printed circuit board;

a cable guide housing having cylinder-shaped multiple cable through-holes, each of the cable through-holes allowing a part of each of the coaxial cables including the cable connector to be inserted and guided therein;

a cable locker fitted over the coaxial cables in a direction perpendicular to an insertion direction of the coaxial cables, which are inserted into the cable through-holes of the cable guide housing, from a lateral surface of the cable guide housing and thus coupling the cable guide housing and the coaxial cables to each other such that the coaxial cables do not move opposite from the insertion direction;

a housing cover covering the lateral surface of the cable guide housing which is coupled to the multiple coaxial cables by the cable locker to prevent the cable locker from being detached;

a reference plate having multiple through-holes, each of the multiple through-holes allowing the cable connector of each of the multiple coaxial cables to be inserted thereinto, and coupled to the cable guide housing such that the housing cover does not move in the insertion direction by a latching protrusion formed on the housing cover; and a housing screw coupling the cable guide housing to a coupling hole formed in the printed circuit board.

2. The multiple coaxial cable connector of claim 1, further comprising an SMD socket having a socket shape with a predetermined height and mounted on a surface of the printed circuit board, the SMD socket having a connector coupling portion formed at each of opposite ends thereof and coupled to the housing screw, multiple contact holes formed in a bottom surface thereof, each of the contact holes allowing an end of each of the multiple coaxial cables to be received therein and make electrical contact with a pattern of the printed circuit board, and the bottom surface contacting the reference plate.

3. The multiple coaxial cable connector of claim 2, wherein an end portion of each of the multiple coaxial cables further has a cylindrical member with a cut lateral surface, the cylindrical member being configured to be elastically deformed in a retracting direction by an external force applied when the cylindrical member is received in an associated one of the multiple contact holes of the SMD socket in order to increase a coupling force between an external conductor of each of the multiple coaxial cables and the bottom surface of the SMD socket.

* * * * *